(12) United States Patent
Kirshenbaum

(10) Patent No.: US 9,195,846 B2
(45) Date of Patent: Nov. 24, 2015

(54) ACCESS GRANTS

(75) Inventor: Evan R Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2018 days.

(21) Appl. No.: 12/243,896

(22) Filed: Oct. 1, 2008

(65) Prior Publication Data

US 2010/0082865 A1 Apr. 1, 2010

(51) Int. Cl.
G06F 21/62 (2013.01)

(52) U.S. Cl.
CPC .................................. *G06F 21/6218* (2013.01)

(58) Field of Classification Search
None
See application file for complete search history.

(56) References Cited

U.S. PATENT DOCUMENTS

| | | | |
|---|---|---|---|
| 7,054,443 B1 | 5/2006 | Jakubowski et al. | |
| 7,725,437 B2* | 5/2010 | Kirshenbaum et al. | 707/640 |
| 7,761,458 B1* | 7/2010 | Eshghi et al. | 707/755 |
| 7,797,323 B1* | 9/2010 | Eshghi et al. | 707/737 |
| 7,831,573 B2* | 11/2010 | Lillibridge et al. | 707/698 |
| 7,856,437 B2* | 12/2010 | Kirshenbaum | 707/737 |
| 7,894,448 B1* | 2/2011 | Lillibridge et al. | 370/395.21 |
| 7,895,666 B1* | 2/2011 | Eshghi et al. | 726/30 |
| 2001/0034839 A1* | 10/2001 | Karjoth et al. | 713/190 |
| 2003/0171975 A1* | 9/2003 | Kirshenbaum et al. | 705/10 |
| 2004/0111613 A1 | 6/2004 | Shen-Orr et al. | |
| 2005/0002532 A1 | 1/2005 | Zhou et al. | |
| 2005/0097313 A1* | 5/2005 | Bolosky et al. | 713/150 |
| 2005/0198497 A1* | 9/2005 | Kocher | 713/158 |
| 2006/0106857 A1 | 5/2006 | Lillibridge et al. | |
| 2006/0282475 A1 | 12/2006 | Suermondt et al. | |
| 2007/0016769 A1 | 1/2007 | Gentry et al. | |
| 2007/0127721 A1 | 6/2007 | Atallah et al. | |
| 2008/0091945 A1* | 4/2008 | Princen et al. | 713/170 |

OTHER PUBLICATIONS

U.S. Appl. No. 11/514,634, filed Sep. 1, 2006, and titled, "Data Structure Representation Using Hash-Based Directed Acyclic Graphs and Related Method".
U.S. Appl. No. 11/888,092, filed Jul. 31, 2007, and titled, "Storing Nodes Representing Respective Chunks of Files in a Data Store".

* cited by examiner

*Primary Examiner* — Michael R Vaughan
(74) *Attorney, Agent, or Firm* — Michael A. Dryja

(57) ABSTRACT

Provided are, among other things, systems, methods, apparatuses and techniques for storing access grants. In one implementation, a blinding factor and access information for accessing a restricted object are obtained; blinded access information is generated for the restricted object based on the access information and the blinding factor; and an anchor node is stored into a data store, with the anchor node being accessible by submission of an identifier, the anchor node at least one of containing or referring to sufficient information to obtain access to the blinding factor and the blinded access information, and the identifier for the anchor node being independent of the blinding factor.

20 Claims, 6 Drawing Sheets

ACCESS GRANTS

FIELD OF THE INVENTION

The present invention pertains to systems, methods, techniques and data structures for managing access grants, e.g., storing and/or verifying access grants in connection with the distribution of decryption keys for encrypted data objects within a file system or distribution of other access codes for retrieval or use of any restricted data, software or functionality.

BACKGROUND

There sometimes exists a need for a secure access management system in which multiple individuals or entities are able to grant access rights to other individuals or entities pertaining to different restricted objects, such as data objects, software or portions of software functionality. One feature that would be desirable within such systems is an ability to easily determine whether one or more access grants previously have been made, thereby allowing grantors to avoid making redundant access grants.

Often, the restricted objects (e.g., data and/or software programs) are structured so as to include a large number of different components that are interrelated with each other, e.g., in a hierarchical manner. A typical example is a data file system in which a root directory includes files and folders, with each of those folders including other files and sub-folders, and so on.

In any event, it sometimes is desirable to restrict access to the individual components across a large number of people or other entities. For example, within an organization it might be desirable for the accounting department personnel to have access to one set of folders and/or files, while the personnel department has access to another, potentially overlapping, set. In addition, it might be desirable for individuals within those departments to have different abilities to access information, e.g., on a need-to-know basis.

Similar considerations apply to software functionality. For example, it might be desirable for customer service personnel to have access to all customer data, but with software functionality that only permits them to view one customer's data at a time, while individuals responsible for policy setting might not need to have access to functionality that retrieves individual customer data but only functionality that aggregates customer data to produce summary reports.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

The present invention is in some respects an extension of the disclosures provided in U.S. patent application Ser. No. 11/149,509, filed Jun. 10, 2005, titled "Identifying Characteristics in Sets of Organized Items" and published as U.S. Patent Application Publication No. 20060282475 on Dec. 14, 2006, Ser. No. 11/514,634, filed Sep. 1, 2006, and titled, "Data Structure Representation Using Hash-Based Directed Acyclic Graphs and Related Method" (the '634 application), and Ser. No. 11/888,092, filed Jul. 31, 2007, and titled, "Storing Nodes Representing Respective Chunks of Files in a Data Store" (the '092 application), which applications are incorporated by reference herein as though set forth herein in full. The present invention also is related to the concurrently filed, commonly assigned patent applications by the present inventor titled "Decryption Key Management" (the "Key Management" application) and "Managing Associations between Keys and Values" (the "Associations" application), which applications also are incorporated by reference herein as though set forth herein in full.

In one respect, the present invention concerns systems, methods, techniques and data structures that can be used to grant access to software functionality or data, particularly when such functionality or data has many different components (e.g., arranged in a hierarchical or other structured manner) and when there are many potential grantors and grantees. The present invention also concerns data structures that can be used in connection with such access grants. As used herein, the term "restricted object" refers to any data object, software component, software functionality or other matter for which access (e.g., in terms of ability to view, edit and/or otherwise use) is limited or restricted (e.g., to those individuals or entities who have the appropriate credential(s)). Although in the following example the restricted objects typically are data objects, the techniques and data structures of the present invention can be used for any other kinds of restricted objects. Examples of such access grants to restricted objects other than data objects include grants of permission for individuals to enter restricted buildings or rooms or to engage in restricted activities.

Figure 1:
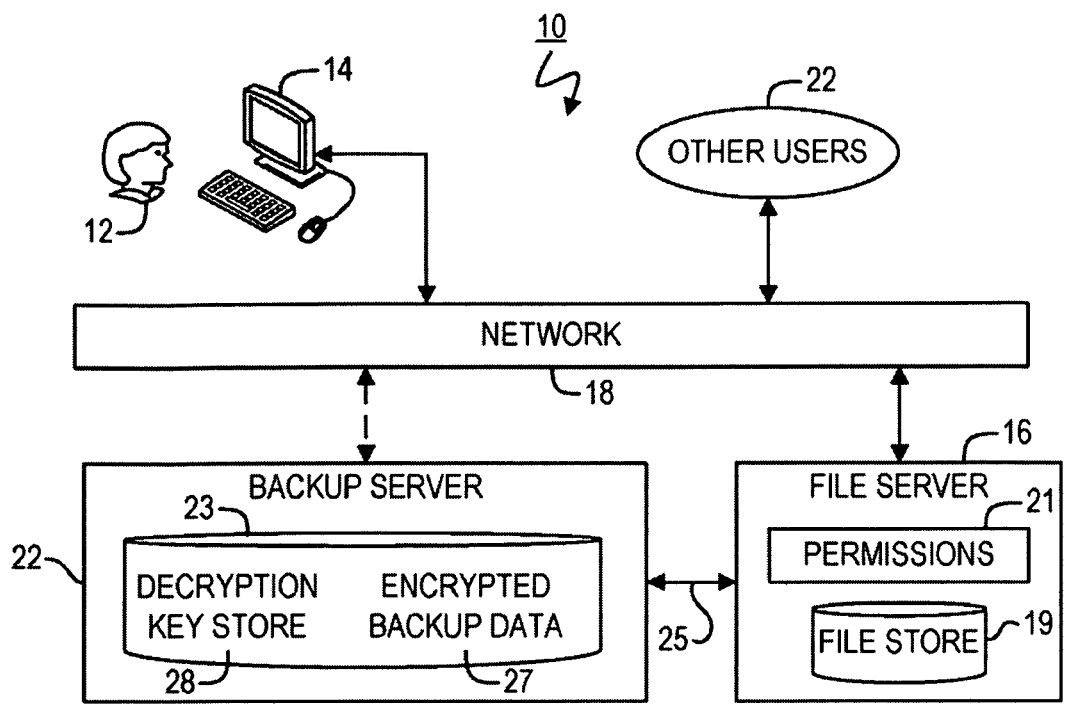
FIG. 1 is a block diagram illustrating a computer system within which certain embodiments of the present invention are implemented.

An example of one context in which certain aspects of the present invention may be utilized is system 10, illustrated in FIG. 1. As shown in system 10, a user 12 operating through a computer 14 accesses data in a file server 16 via network 18. At the same time, a number of other users 22 (e.g., tens, hundreds or thousands of other users) also are able to access file server 16 via network 18. Within file server 16 is a file store 19 which typically includes a number of data files arranged in a hierarchical data structure. Such files are accessible through file server 16, subject to user-defined permissions 21 that specify who has access to what files, folders, directories, etc. It is noted that although server 16 is shown as a single component, it often in fact is comprised of multiple server boxes (e.g., collectively functioning as a single logical unit).

Also provided in system 10 is a backup server 22 (which also can include multiple server boxes collectively functioning as a single logical unit) that backs up the file system data contained in the file store 19. In certain embodiments of the invention, such backups are performed periodically (e.g., weekly, nightly or hourly); in other embodiments, such backups are performed on a continuous basis (e.g., automatically creating an archive copy of prior versions of files as they change or as the new versions are saved by the user 12); in still further embodiments, such backups are performed when and/or to the extent manually designated by user 12 (e.g., when a new version of a software product is released, the user 12 might designate that all of the source code and other files related to it are to be archived); in still further embodiments, such backups are performed using any combination of the foregoing approaches.

For such purposes, backup server 22 includes (or has access to) at least one storage medium 23, which in certain embodiments of the invention is removable from backup server 22. In the various embodiments, the backup communications 25 between file server 16 and backup server 22 are via a direct connection, via network 18, via another network (e.g., the Internet) and/or via any other communications link. In order to provide greater protection against a widespread disaster, it sometimes is desirable to locate backup server 22 and/or storage medium 23 in a remote facility (e.g., in a different region of the country).

In alternate embodiments of the invention, file store 19 and/or backup server 22 (e.g., implemented as a backup utility) are located on local device 14, rather than being accessed from a separate server 16 or 22, respectively, across network 18. For example, it can be beneficial to include such an encrypted archive on computer 14 if there is more than one person who has access to computer 14 and/or if others are provided remote access to computer 14.

Preferably, backup server 22 stores the backed-up data 27 in a hierarchical arrangement that generally matches the hierarchical arrangement of the data objects in file store 19. At the same time, however, in order to save storage space and data transmission bandwidth, the backed-up data 27 preferably are stored in such a way that when it is determined that content to be stored already is present on backup server 22, only a single copy is stored (or, for redundancy purposes, a specified number of copies are stored) and a new copy need not be transferred. One preferable way of achieving this goal is to store the backed-up data 27 within a data structure formatted as a hash-based directed acyclic graph (HDAG) that mirrors the hierarchical arrangement of data objects in file store 19, e.g., as described in the '634 application and/or the '092 application. In this regard, it is noted that backup server 22 often will make multiple backups at different points in time, with each backup essentially being a snapshot of the contents of file store 19 any given point in time. Also, multiple file stores 19 might back up data using backup server 22 and their file stores 19 might contain some of the same content. The use of a HDAG data structure as described in the '634 application and/or the '092 application often provides significant efficiencies by eliminating repeated storage of the same data.

Figure 2:
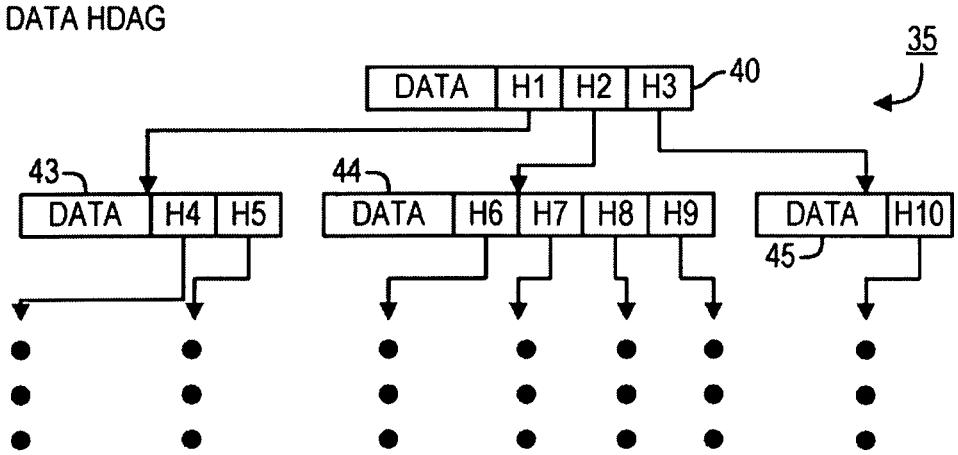
FIG. 2 illustrates a portion of a HDAG data structure.

An example of such a HDAG data structure 35 is shown in FIG. 2. In this example, all of the backed-up data 27 are represented by a root node 40 (e.g., corresponding to a drive that includes the entire contents of the file store 19). Node 40, in turn, has a number of child nodes, such as child nodes 43-45 (e.g., corresponding to different directories within the main drive). Included within root node 40 is certain data (typically, just metadata at this level) and a separate hash of the contents of each of its child nodes (e.g., hashes H1-H3 of nodes 43-45, respectively), with each hash also functioning as a reference to the corresponding child node.

Each such child node 43-45, in turn, includes a number of its own children (e.g., corresponding to folders and/or files within those directories), again with each such child represented within the subject node (e.g., one of nodes 43-45) by a hash of the child node's contents, with such hash also functioning as a reference to the child node. In practice, the hierarchical data structure can be large and include many levels, with individual folders containing subfolders and with documents, files or other data objects being included within any or all of such drives, directories, folders and subfolders. Typically, only the data fields in the leaf nodes contain actual content other than metadata. In certain embodiments of the invention, the HDAG data structure 35 extends down below the level of file, splitting up large files into multiple chunks, so that at least some of the leaf nodes correspond to data chunks that are just portions of a file.

In any event, in accordance with the general HDAG structure, higher-level nodes include one or more hashes, generated from content within their child nodes. Typically, each such hash is calculated across all of the content of the corresponding child node. However, in certain embodiments, the hash is only calculated across content within the corresponding child node that is deemed as relevant (e.g., content that one wishes to monitor).

As a result of this structure, and assuming that each parent includes a hash for each child (or at least each relevant child) the backup server is able to determine whether an entire sub-structure of the hierarchy corresponding to the hash of its topmost node already has been stored (or, more generally, is otherwise present) and, if so, to simply include a reference to the previously stored node. On the other hand, if the entire sub-structure is not present, the topmost node is sent and the system preferably drills down deeper into the hierarchy to check for matches at lower levels. The end result is that preferably only the smallest data units monitored that actually have been modified since the last backup (along with a "spine" of nodes above them) are copied over in the current backup. As noted above, this data storage approach is described in more detail in the '634 application and in the '092 application. It is further noted that, although described above in the context of a data-backup operation, HDAG structures can in fact be used in a wide variety of situations where comparisons between sets of data objects are desirable.

As also noted above, in the present embodiment, associated with the data stored in file store 19 is a corresponding set of permissions 21 indicating who has rights to view and/or edit various aspects of the data and data structure. In order to enforce those permissions in the backup copy of the data 27, such data 27 (or at least any restricted file within data 27) preferably is encrypted, with the decryption key for a particular directory, folder, file or other data object being made available only to those entities that have been given permission to access it. Accordingly, storage medium 23 preferably also includes a decryption key data store 28 to manage the storage and retrieval of the decryption keys. In the preferred embodiments, the data in decryption key store 28 are stored in the same or similar data structures that are use to store the actual backup data 27.

Figure 3:
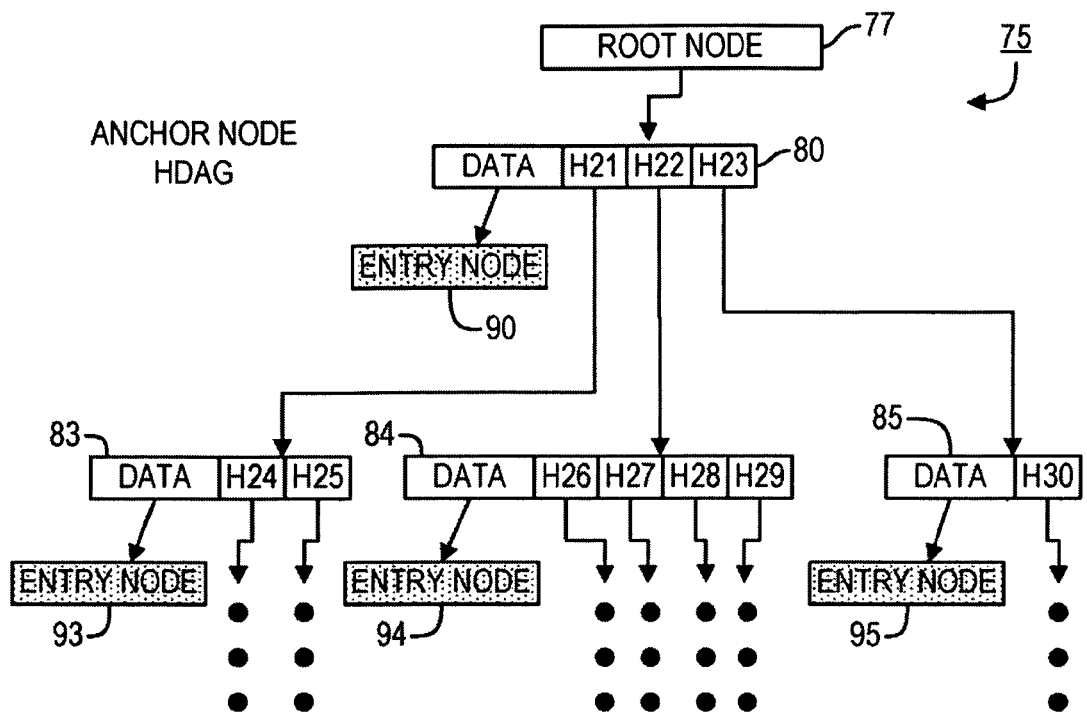
FIG. 3 illustrates a data structure for storing anchor nodes according to a representative embodiment of the present invention.
Figure 4:
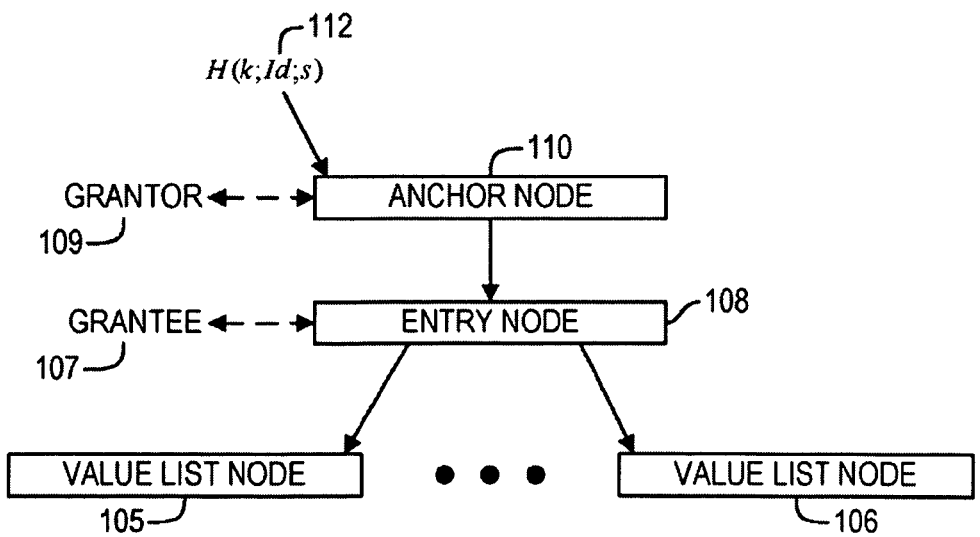
FIG. 4 illustrates an exemplary data structure used in connection with a single access grant.

More specifically, FIG. 3 illustrates a data structure 75 for storing access grants according to a representative embodiment of the present invention. As shown, data structure 75 includes a plurality of "access nodes" or "anchor nodes" 80 and 83-85 arranged in a hierarchical manner. Ordinarily, the hierarchical structure 75 will continue on beneath nodes 83-85, potentially having tens or even hundreds of levels and hundreds, thousands or even more nodes. Preferably, the data structure 75 mirrors (or is otherwise based on) the data structure 35 in which the data objects are stored, e.g., with node 80 corresponding to, and reflecting any access grants with respect to, node 40 and with nodes 83-85 corresponding to and reflecting any access grants with respect to nodes 43-45, respectively. However, levels of the data HDAG (or other hierarchical structure) 35 for which access has not been granted (for purposes of this access grant) preferably are omitted from HDAG 75.

As used herein, a "node" refers to a storage location containing associated values in an overall data structure, potentially including references to one or more other nodes, and accessing the node permits retrieval of information contained within the node or referenced by it. Other than the root node 77 and the leaf nodes, each node of data structure 75 includes data (discussed in more detail below) and a number of hash values, each such hash value having been generated based on contents of a different child node and preferably functioning as a reference to that child node (also discussed in more detail below). Thus, the hash values H21-H23 in anchor node 80 were generated based on the contents of, and refer to, child nodes 83-85, respectively. The root node 77 includes a hash of contents of the top access grant node 80, so querying for the existence of a complete HDAG rooted at root node 77 provides a simple method of determining whether all access grants that are supposed to be in this HDAG 75 are in fact there.

In the present embodiment, one element included within each anchor node in which access is granted is a reference to an "entry node" through which the grantee may retrieve a decryption key or other information necessary to access or use the corresponding data object or other restricted object. Thus, for example, anchor nodes 80 and 83-85 reference entry nodes 90 and 93-95, respectively. The entry nodes can be considered to be the actual access grants, and by virtue of the fact that they are child nodes of their corresponding anchor nodes, can be considered to be part of the overall HDAG structure 75. Also, because each entry node is a child of an anchor node, it cannot be designated as "garbage" until the anchor node is, and so the access grant must remain in effect at least that long.

It is noted that each anchor node need not correspond to an actual access grant and, therefore, need not have any reference to an entry node. In fact, in certain embodiments, only the leaf anchor nodes actually correspond to access grants. In other embodiments (such as it is shown in FIG. 3), higher-level anchor nodes also can represent access grants (e.g., for folders, directories or the like) rather than requiring separate leaf anchor nodes. In certain embodiments, each anchor node is restricted to corresponding to at most one access grant (not including access grants corresponding to its child anchor nodes, if any). In other embodiments, some anchor nodes can correspond to multiple access grants. Such multiple access grants can include access grants for one restricted object to multiple grantees, access grants for multiple restricted objects to a single grantee, or any combination thereof. In such embodiments some or all of the multiple access grants may be combined into a single entry node and/or the anchor node can contain references to multiple entry nodes.

In HDAG data structure 75, parent nodes store hashes of contents of their child nodes in a recursive manner, such that hashes in higher-level nodes represent all of the HDAG structure beneath them. Accordingly, one advantage of structure 75 is that the presence in the store of a complete HDAG rooted at a single anchor node can be queried to determine whether all access grants below that node that are desired to be made (e.g., with respect to a particular grantee) have already been made. The identifier used for making this query is a value (preferably a cryptographic hash) computed over some (but, as explained below, preferably not all) of the contents of the anchor node, including references to its anchor node children. When each anchor node is created a grant identifier value is inserted in the anchor node's data for each access grant corresponding to it. That grant identifier (shown as element 114 in FIG. 5) preferably is calculated as H(k;Id;s), where H(−) is a hashing operation (e.g., MD-5, the message digest algorithm 5, or SHA-1, the secure hash algorithm 1); x;y;z refers to the concatenation or other preferably unique combination of the values x, y and z; k is a symmetric encryption/decryption key (or other access value) for the data object corresponding to the anchor node 110; Id is an identity code for the grantee; and s is secret information known only to a trust group or domain (which may include just the grantor or multiple people and/or other entities who trust each other). In the preferred embodiments, k itself is a hash of the unencrypted contents of the data object to which it corresponds.

By requiring anybody who asks about this anchor node 110 to know both k and s, it becomes quite unlikely that a malicious party will be able to fool a grantor into believing that it had already granted access. If s is found to have been compromised, a new one can be generated; then, access grant nodes using the old value of s preferably are ignored, and a new access grant HDAG is stored. A client may have different trust groups associated with different user identities to which it may wish to grant access. If it does not trust anyone else with respect to some or all identities, it can establish a single-ton trust group by making the secret information be actually private. If it wants to trust everyone, and everyone else is similarly trusting, it can forgo the secret entirely. If one client starts to suspect that the trust group has been compromised, it can negotiate a smaller one (if it has reason to suspect some members) or it can switch to using private secret information.

According to the present data structure, the anchor node 110 functions as the primary access node for grantors 109, allowing a grantor 109 to query for the existence of a particular anchor node 110 (using the anchor node's identifier, e.g., identifier 112) and thereby ensure that the appropriate access grant has been made. As indicated above, the assertion of an access grant preferably also results in the creation of an entry node 108, which serves as the primary access node for the grantee 107, allowing the grantee 107 to obtain the access information for the data object (or other restricted object). In addition, in certain embodiments one or more value list nodes 105 and 106, which are internal to the data store 28 and used to manage the access information, are created or modified, as appropriate. Additional information regarding entry nodes and value list nodes is provided below, as well as in the "Key Management" application and the "Associations" application.

Figure 5:
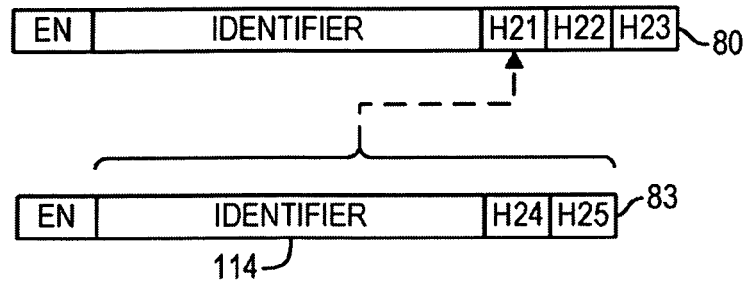
FIG. 5 illustrates the contents of an anchor node and its relationship to its parent according to a representative embodiment of the present invention.

FIG. 5 illustrates the contents of an anchor node 83, as well as its relationship to its parent node 80, according to a representative embodiment of the present invention. As shown, the data portion of anchor node 83 includes a reference EN 113 to its entry node 93 (e.g., as shown in FIG. 3), if any, and a grant identifier 114 (e.g., H(k;Id;s)). However, only the portions other than EN 113, i.e., grant identifier 114 and the references H24 and H25 to the child anchor nodes of the current anchor node 83 are hashed, with the resulting value being stored as H21 in the parent node 80 and used as the reference back to anchor node 83. Some of the reasons for excluding EN 113 (i.e., the reference to the entry node) from the value that is to be used as a reference to anchor node 83 are as follows.

Figure 6:
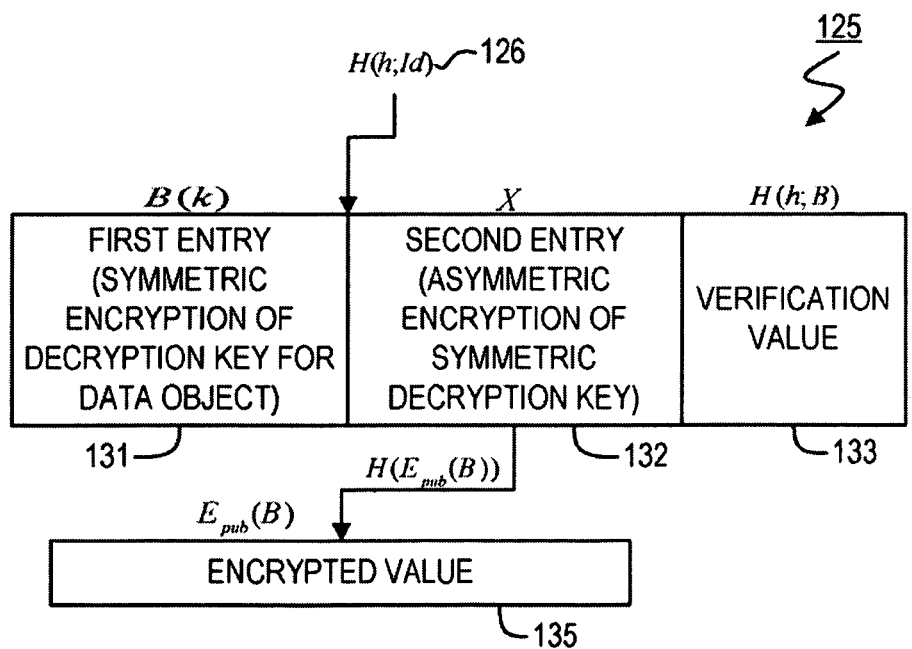
FIG. 6 illustrates an entry node according to a representative embodiment of the present invention.

As described in the "Associations" application, each entry node preferably asserts one or more associations, each between an access key and a data value. As further described there, when the store managing the associations is presented with a request to look up values associated with an access key, it responds with a (possibly empty) set of values reflecting all such associations (which may be due to multiple entry nodes) that the requestor has permission to see. FIG. 6 shows such an association 125 as might be contained within entry node 93 (shown in FIG. 3). As indicated, the association is between an access key 126, H(h;Id), where h is a unique identifier for the data object (such as a file path and name or a hash of the encrypted contents of the data object) and a value containing (at least) three items 131-133. Item 131 in the value is B(k), the symmetric encryption of k using the code B as an encryption key. Item 132 in the value contains a reference to a node 135 that includes an encryption of the blinding factor, e.g., $E_{pub}(B)$ where $E_{pub}(\times)$ is an encryption using the grantee's public key in this example. In the preferred embodiment, item 132 would therefore be the cryptographic hash of a node (e.g., node 135) containing $E_{pub}(B)$. Item 133 is a verification value of H(h;B) which allows the grantee to verify that the obtained value for B is correct without having to first encrypt the entire data object. The use of these values and the reasons for including them in the association value are described more fully in the "Key Management" application. In other embodiments, the values associated with the association key may be different.

The reference EN 113 preferably is defined as a hash of the entry node 93. However, as noted above, entry node 93 preferably contains a hash of a node containing $E_{pub}(B)$, or some other function of B, which preferably is a session-specific symmetric encryption/decryption key (although in alternate embodiments it is any other desired blinding factor). The use of the session code B, while providing certain advantages that are described more fully in the "Key Management" application, means that when a grantor inquires about the anchor node 83, it typically will have no way of generating EN 113 and so would not be able to find or verify the stored anchor node were EN 113 to be included as part of the hash. The use of hashed and non-hashed portions of the anchor nodes can be used to avoid this problem. Thus, by excluding reference to the entry node, and otherwise generating the anchor node's identifier independently of the blinding factor B, it is possible to use different values B in different access-granting sessions while ensuring that all anchor nodes reflecting the grant of access to the same restricted object for the same grantee (among mutually trusting grantors) will have the same identifiers, thus still permitting a generic query as to whether or not a particular access grant exists within the data store 28.

Figure 7:
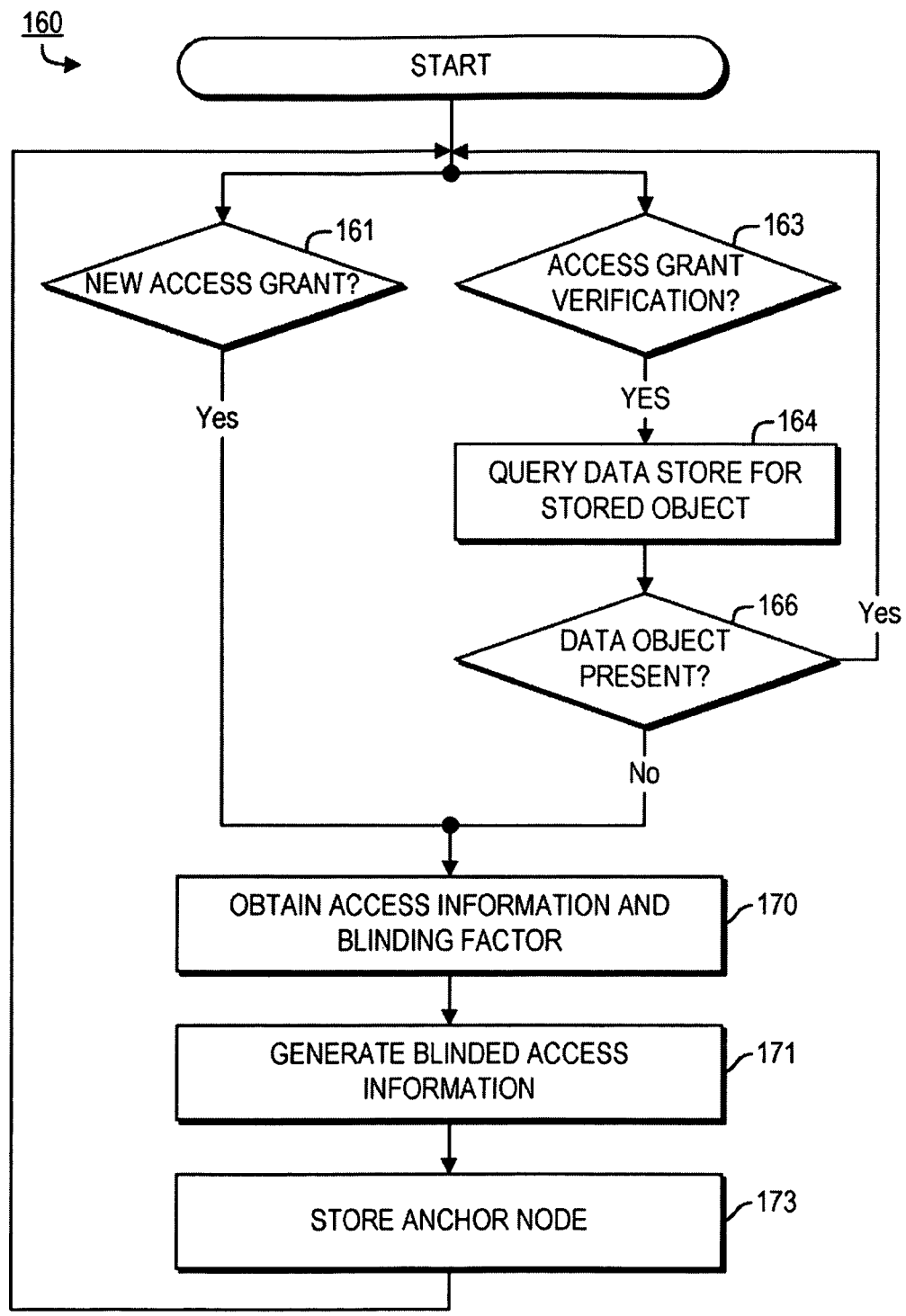
FIG. 7 illustrates a flow diagram of a process for managing access grants.

FIG. 7 illustrates a flow diagram of a process 160 for managing access grants according to a representative embodiment of the present invention. Except as otherwise noted, the steps of process 160 preferably are fully automated so that they can be implemented, e.g., by executing computer-executable process stored on a computer-readable medium (which can include multiple individual media) executed by software associated with the data store 28 or the grantor 109, or in any of the other ways discussed herein. However, any subset (or all) of such steps instead can be implemented manually.

The main body of process 160 is triggered by either of two different events. If it is determined in step 161 that a new access grant is to be made with respect to a restricted object, then processing proceeds to step 170. Such a determination can be made, e.g., by software associated with data store 28 in response to a grantor requesting assertion of an access grant or requesting storage of an anchor node or entry node. Alternatively, the determination can be made by the grantor 109 or by software associated with the grantor or 109.

In many cases, however, the grantor 109 will not be absolutely certain that the desired access grant is new (i.e., that it does not already exist, e.g., within data store 28). Accordingly, in such cases the grantor 109 preferably requests verification that a particular desired access grant does not exist within data store 28 before storing it. Such a request results in an affirmative determination in step 163 (which can be made, e.g., in any of the same ways as the determination of step 161). In any event, in the event of a positive determination in step 163, processing proceeds to step 164.

In step 164, the data store 28 is queried for the existence of an anchor node corresponding to the access grant. To do this, the identifier for the anchor node must be obtained. In some embodiments, if such a grant has been made previously, it can be possible to obtain this identifier from a local (or remote) cache. Otherwise, it preferably is obtained by constructing the anchor node as a leaf node (i.e., with no anchor node children), with the data containing the grant identifier for the access grant, and the identifier for the anchor node is computed by taking the cryptographic hash over its contents. Because the anchor node's identifier is computed by excluding any references to entry node children, at this point the entry nodes need not be created. As noted above, the grant identifier for an access grant preferably is determined as H (k;Id;s), i.e., a cryptographic hash (or, in alternate embodiments, some other function) of the access information for the restricted object (e.g., symmetric encryption/decryption key k), identification or credential information for the intended grantee Id and, potentially, some secret information s. By using a cryptographic hash, the identifier is essentially unique, because there is such a low probability of collision, but it is not necessarily strictly unique, and because the access grant contains such a grant identifier, it inherits this property.

In step 166, if such an anchor node is not present within data store 28, then processing proceeds to step 170. Otherwise, processing returns to wait until a new request is made (resulting in an affirmative determination in step 161 or step 163).

In step 170, access information (e.g., symmetric encryption/decryption key k) and a blinding factor (e.g., symmetric encryption/decryption key B) are obtained. In the preferred embodiments, the same blinding factor is used across multiple access grants (e.g., all access grants made to the same grantee in a particular session). If the blinding factor is obtained by creating it or if it is not known that an encrypted blinding factor node 135 exists for the particular combination of blinding factor and grantee, an encrypted blinding factor node 135 is created, containing $E_{pub}(B)$, its identifier is computed, the store is queried for the presence of a node with the corresponding identifier, and if it is not present, the encrypted blinding factor node 135 is stored in the data store 28.

In step 171, blinded access information is generated for the restricted object based on the access information and the blinding factor. Preferably, such information is generated by using symmetric encryption/decryption key 13 to encrypt data that includes the access information (e.g., the access information alone or the access information together with other information). This information is used to generate an entry node 93, referring to the encrypted blinding factor node 135, and the entry node 93 is stored in the data store 28.

In step 173, an anchor node, containing the grant information 114 and a reference to the entry node 93, is constructed and stored into the data store 28 (e.g., in a hierarchical HDAG data structure). Preferably, the anchor node includes the information indicated above and, as also indicated above, is accessible by submission of an identifier that is independent of the blinding factor (e.g., exclusive of the reference to the entry node and/or other portions of the anchor node that includes the blinding factor). That is, the identifier preferably is not a function of the blinding factor, and knowledge of the blinding factor is not needed in order to generate the identifier. More preferably, the data structure into which the anchor node is stored preferably is based on (e.g., mirrors, matches or corresponds to) at least part of a structure (e.g., hierarchical data structure) in which the underlying restricted objects are arranged (or in which such restricted objects can be conceptualized as being arranged).

Upon completion of step 173, processing returns to wait until a new request is made (resulting in an affirmative determination in step 161 or step 163). In this manner, a plurality of anchor nodes that include blinded access information for a corresponding plurality of restricted objects are stored, preferably into a common (e.g., HDAG) structure. As noted above, for any given session in which access is granted to a particular grantee (potential involvement in access grants to multiple, even hundreds or thousands of, restricted objects), the blinded access information within each of such anchor nodes preferably is generated using the same blinding factor.

Figure 8:
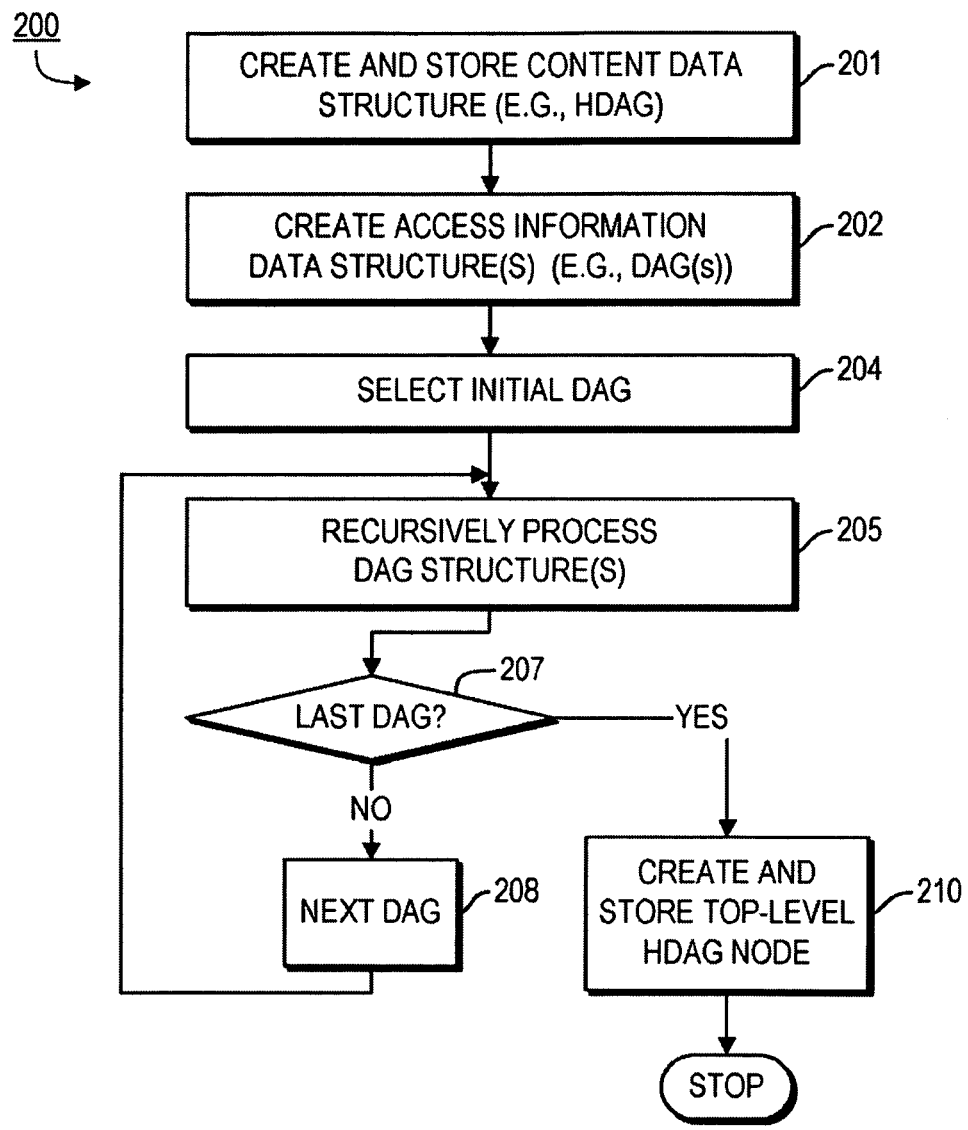
FIG. 8 illustrates a flow diagram of a process for backing up data involving restricted access grants.

FIG. 8 illustrates a flow diagram of an exemplary process 200 for managing access grants within the context of a backup operation according to a representative embodiment of the present invention. Except as otherwise noted, the steps of process 200 preferably are fully automated so that they can be implemented, e.g., by executing computer-executable process stored on a computer-readable, or in any of the other ways discussed herein.

In process 200, a directory tree within file store 19, along with all applicable access grants, is to be stored on backup server 22. Although the steps of process 200 (as with the other processes described herein) are indicated as occurring in a particular sequence, it should be understood that the sequence illustrated and discussed is merely exemplary; as will be readily apparent, such sequence can be altered and/or individual steps often will be capable of being performed concurrently.

Initially, in step 201 the contents of the directory tree are stored, as an HDAG (e.g., HDAG 35), within backup server 22, with any files or directories for which access it to be restricted encrypted as described in the '634 application and the "Key Management" application.

In step 202, a data structure is constructed containing a set of directed acyclic graphs (DAGs), one associated with each grantee being given access to a restricted file or directory. The leaves of the DAGs represent individual access grants and contain h (the hash of the root node of the HDAG representing the encrypted file or directory), k (the hash of the root node of the HDAG representing the unencrypted file or directory, which is also the decryption key for the encrypted HDAG), and the hash identifier of the anchor node that would represent this access grant (which can be computed from k, Id, and s). The non-leaves of the DAGs contain the hash identifiers of the non-leaf anchor nodes as well as pointers to child (DAG) nodes. These data structures, along with the Id (and corresponding public key) corresponding to each DAG and the secrets known to the backup system, contain sufficient information for constructing the anchor node HDAG. In a preferred embodiment, steps 201 and 202 are performed concurrently.

In alternative embodiments, other data structures are used instead. In certain alternate embodiments, rather than a set of grantee-specific DAGs, a single DAG is used, with the DAG nodes containing an indication of the identity of the grantee. In some embodiments, the leaves represent all grants (or all grants to a single grantee) at a single directory level. In some embodiments, some or all of the information used to construct the DAGs comes from information cached locally during previous invocations.

In some embodiments, mechanisms are employed to determine that parts of the directory tree (and their associated access grants) have not changed since the last time they were backed up. Such mechanisms can include, e.g., conventional mechanisms employed in data-backup operations in which the backup software (1) requests that the operating system notify it of certain or all filesystem changes regarding managed parts of the filesystem and (2) stores in the local file system information about information used to construct the data and access grant HDAGs during previous backup operations. In some of such embodiments, the DAG can be incomplete but contain sufficient information (e.g., file or directory names) to recreate the missing parts if necessary, thereby avoiding unnecessary processing.

In step 204, the first DAG to be processed is selected. Typically, the selection can be arbitrary.

Figure 9:
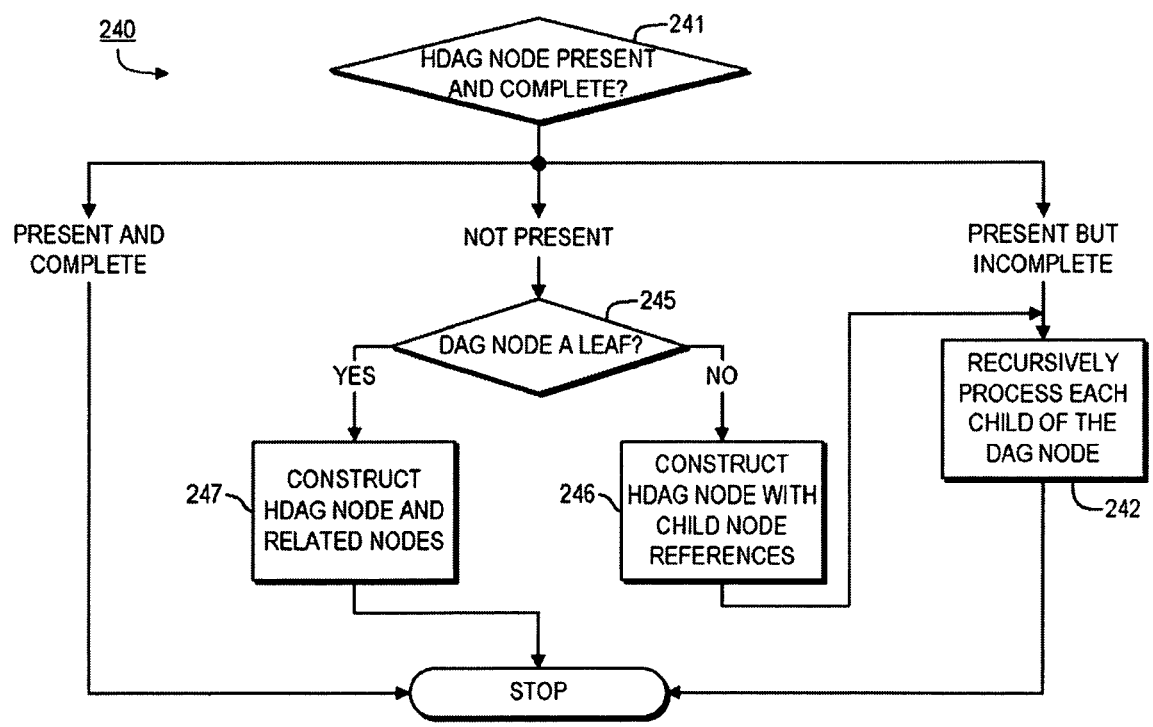
FIG. 9 illustrates a flow diagram of a recursive process for constructing and/or verifying existence of, access-grant structures corresponding to an access directed acyclic graph (DAG), or a portion thereof.

In step 205, one or more structures of the current DAG are processed (preferably recursively, if necessary) in order to generate, and/or verify existence of the appropriate access-grant structures. The specific details of the preferred processing that is performed for each such structure are described below in connection with FIG. 9. The selection of the structure(s) to be processed in this step 205 preferably depends upon the immediate circumstances. In some cases, the selected structure is the entire DAG. In other cases, e.g., where it is known or expected that only certain portions of the DAG have been modified, only those portions (or substructures) are selected for processing. In any event, it is noted that each such structure can be specified by its root node.

In step 207, a determination is made as to whether the DAG that was just processed was the last DAG. If so, then processing proceeds to step 210. If not, then another DAG is selected (e.g., arbitrarily) in step 208 and then processing returns to step 205 in order to process it.

In step 210, a top-level HDAG node is constructed and stored. Preferably, such top-level HDAG node contains references to the anchor node HDAGs represented by the roots of each of the DAGs in the set and the HDAG representing the stored data. In addition, the top-level HDAG node preferably is associated with a retention policy.

The preferred processing technique 240 for use in step 205 (discussed above) is now discussed with reference to FIG. 9. Except as otherwise noted, the steps of process 240 preferably are fully automated so that they can be implemented, e.g., by executing computer-executable process stored on a computer-readable, or in any of the other ways discussed herein.

Initially, in step 241, with respect to a specified DAG structure rooted at a particular node, the data store 28 is queried for the presence of a complete HDAG structure (which could be a portion of a larger HDAG) rooted at a node whose hash identifier is the one specified at the DAG node. There are three possible responses to the query: (1) the HDAG exists (i.e., a node having such hash identifier exists within data store 28) and is complete (i.e., all nodes contained within the HDAG rooted at the node having the hash exist within data store 28), (2) the node exists, but the HDAG rooted there is not complete, and (3) the node does not exist.

In the first case (i.e., the response indicates that the HDAG exists and is complete), no further processing need be done and the process terminates, thereby providing significant efficiency. In the second case (i.e., the response indicates that the node exists, but the HDAG is incomplete), processing proceeds to step 242. In the third case (i.e., the response indicates that the node does not exist), processing proceeds to step 245.

In step 242, the recursive process 240 is performed on each of the children of the DAG node, after which the process terminates.

In step 245, a determination is made as to whether the current DAG root node is a leaf node. If not, then processing proceeds to step 246. On the other hand, if the DAG node is a leaf node, then processing proceeds to step 247.

In step 246, an anchor node is created. The new anchor node contains references to the anchor node children, using information contained in the children of the DAG node. Thereafter, processing proceeds to step 242 in order to process each such anchor child node.

In step 247, the anchor node, the associated entry node and, if necessary, an encrypted blinding factor node (such as node 135) are constructed and stored, e.g., using a process analogous to steps 170-173 in FIG. 7. Upon completion of this step, the process terminates.

The foregoing discussion concerns a single HDAG for storing access grants. In fact, in most embodiments multiple HDAGs will be created and stored, e.g., one for each grantee and, typically, with different HDAGs being created by different grantors. In certain embodiments, a single access grant HDAG can be used for more than one grantee identity, but such an approach might make sharing more difficult.

The access grant HDAGs (e.g., HDAG 75) preferably are stored in retention groups (i.e., having common retention policies), which can be the same as or different than the retention groups used to control the data HDAG (e.g., HDAG 35). If different retention policies are desired for access grants for different grantees or for different items granted to the same grantee, multiple access grant HDAGs preferably are used. In the embodiment described above, in which the access grant HDAG 75 ensures the presence of the access grants themselves, this approach allows the lifetimes of the access grants to be controlled independently of the lifetimes of the data objects. That is, either may outlive the other. For example, if a particular data object disappears and then reappears while the access grant is in place, access preferably is restored.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or an 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, an 802.11 protocol, or any other cellular-based or non-cellular-based system), which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memoiy devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of storing access grants, comprising;
obtaining a blinding factor and access information for accessing a restricted object;
generating blinded access information for the restricted object based on the access information and the blinding factor; and
storing an anchor node into a data store,
wherein the anchor node is accessible by submission of an identifier,
wherein the anchor node at least one of contains or refers to sufficient information to obtain access to the blinding factor and the blinded access information,
wherein the identifier for the anchor node is independent of the blinding factor.

2. A method according to claim 1, wherein the sufficient information provides access to the blinding factor only in an encrypted form.

3. A method according to claim 2, wherein the encrypted form comprises data that includes the blinding factor and that has been encrypted using a public key associated with an intended grantee.

4. A method according to claim 1, wherein the identifier comprises a cryptographic hash of specified content within the anchor node. but wherein the specified content is less than all content within the anchor node.

5. A method according to claim 1, further comprising a step, performed prior to said storing, of querying the data store for presence of a stored object corresponding to the identifier, and wherein said storing is performed in response to a query reply that the data store previously did not include any such stored object.

6. A method according to claim 1, wherein the identifier is a specified function of secret information.

7. A method according to claim 6, wherein the secret information is shared among plural members of a trust domain.

8. A method according to claim 6, further comprising a step of using the secret information to generate identifiers of plural different anchor nodes in plural different access-grant sessions.

9. A method according to claim 1, wherein the identifier is a function of identification information for an intended grantee.

10. A method according to claim 1, wherein the blinding factor comprises a symmetric encryption/decryption key and the blinded access information is generated by using the symmetric encryption/decryption key to encrypt data that includes the access information.

11. A method according to claim 1, further comprising a step of repeating said storing step so as to store a plurality of anchor nodes that include blinded access information for a corresponding plurality of restricted objects, the blinded access information within each of the plurality of anchor nodes having been generated using the blinding factor.

12. A method according to claim 11, wherein the plurality of anchor nodes is stored within a hierarchical structure in the data store.

13. A method according to claim 12, wherein the hierarchical structure is a hash-based directed acyclic graph (HDAG).

14. A method according to claim 12, wherein the hierarchical structure is based on at least part of a second hierarchical structure in which the plurality of restricted objects is arranged.

15. A method according to claim 12, wherein said storing of the anchor node is performed as part of a process that comprises recursively checking for presence of lower-level structures of the plurality of anchor nodes within the data store, until presence of all required structures is verified.

16. A method according to claim 1, wherein the anchor node refers to an entry node that can be accessed using a key to obtain the blinded access information and information for obtaining the blinding factor.

17. A method according to claim 16, wherein the key is a function of identification information for the restricted object.

18. A method according to claim 1, wherein the access information can be derived from the blinded access information and the blinding factor.

19. A non-transitory computer-readable medium storing computer-executable process steps for storing access grants, said process steps comprising:
obtaining a blinding factor and access information for accessing a restricted object;
generating blinded access information for the restricted object based on the access information and the blinding factor; and
storing an anchor node into a data store,
wherein the anchor node is accessible by submission of an identifier,
wherein the anchor node at least one of contains or refers to sufficient information to obtain access to the blinding factor and the blinded access information,
wherein the identifier for the anchor node is independent of the blinding factor.

20. An apparatus for storing access grants, comprising at least one hardware processor to:
obtain a blinding factor and access information for accessing a restricted object;
generate blinded access information for the restricted object based on the access information and the blinding factor; and
store an anchor node into a data store,
wherein the anchor node is accessible by submission of an identifier, wherein the anchor node at least one of contains or refers to sufficient information to obtain access to the blinding factor and the blinded access information, wherein the identifier for the anchor node is independent of the blinding factor.

* * * * *

UNITED STATES PATENT AND TRADEMARK OFFICE
CERTIFICATE OF CORRECTION

Page 1 of 1

PATENT NO. : 9,195,846 B2
APPLICATION NO. : 12/243896
DATED : November 24, 2015
INVENTOR(S) : Kirshenbaum It is certified that error appears in the above-identified patent and that said Letters Patent is hereby corrected as shown below:

In the claims,

In column 13, line 52, in Claim 4, delete "node. but" and insert -- node but --, therefor.

Signed and Sealed this
Twenty-second Day of March, 2016

Michelle K. Lee
*Director of the United States Patent and Trademark Office*